United States Patent [19]

Yagishita et al.

[11] 4,047,228
[45] Sept. 6, 1977

[54] RECEIVING SYSTEM FOR FACSIMILE AND THE LIKE

[75] Inventors: Tohmi Yagishita; Hiroshi Hagiya, both of Tokyo, Japan

[73] Assignee: Oki Electric Industry Co., Ltd., Tokyo, Japan

[21] Appl. No.: 604,119

[22] Filed: Aug. 13, 1975

[30] Foreign Application Priority Data

Aug. 20, 1974 Japan .................................. 49-95159

[51] Int. Cl.² ......................... H04N 1/40; H04N 7/12
[52] U.S. Cl. ................................................. 358/261
[58] Field of Search ...................... 178/6, 6.8, DIG. 3; 358/260, 261

[56] References Cited

U.S. PATENT DOCUMENTS

| | | | |
|---|---|---|---|
| 3,840,698 | 10/1974 | Hinoshita | 178/6.8 |
| 3,895,184 | 7/1975 | Komura | 178/6 |

*Primary Examiner*—Howard W. Britton
*Attorney, Agent, or Firm*—Kenyon & Kenyon

[57] ABSTRACT

The present invention provides a receiving system, for a facsimile system wherein when a large portion of a scanning line of an original pattern consists of only black (or only white), that portion is not transmitted in order to reduce the transmission time. The received facsimile signal has three families, synchronizing signals, group weight indicator signals and picture signals. The present receiver comprises: a means receiving said synchronizing signal for discriminating said synchronizing signal; a means receiving said group weight indicator signals following said synchronizing signal, for storing said group weight indicator signals in a temporary memory; a means reading said group weight indicator signals from said temporary memory for deciphering the signals thus read, prior to recording said picture signals on a recording paper; a means performing predetermined addition on a selective address register, based on the result of said deciphering; a means immediately distributing and applying picture signals to selected recording elements in accordance with addressing by said selective address register; a means recording said picture signals on a recording paper, and; a means performing auxiliary scanning during a period for receiving said synchronizing signal and said group weight indicator signals.

3 Claims, 6 Drawing Figures

| A | B₁ | C | A | B₂ | C₂ | A | B₂ | C₃ |

RECEIVING SYSTEM FOR FACSIMILE AND THE LIKE

BACKGROUND OF THE INVENTION

This invention relates to a receiver in a facsimile and the like system for receiving picture information, which system reduces the transmitting time by using the properties of pictures and by eliminating redundancies of pictures for reducing the amount of information to be transmitted and received.

It has been said that picture transmission by conventional facsimile consumes much time, and a wide variety of systems for reducing the transmitting time have been proposed. Of the proposed systems, those using the aforesaid redundancy elimination are called band reduction systems, and such systems have been actually used. Among the band reduction systems, the so-called runlength coding system has been well-known and it is expected to greatly reduce the transmitting time. However, such conventional band reduction systems have a shortcoming in that, since the systems have to use digital transmission for sending information because of their intrinsic nature, the transmission is susceptible to various influences, such as transmission circuit characteristics including phase distortion and frequency distortion, noise, short breaks of transmission circuits, and the like. As a result, the rate of causing disturbances in the received picture is fairly high, and it is desired to minimize such disturbances by contriving system constructions which are not susceptible to the aforesaid influences. The band reduction systems do not provide direct transmission of the output from a photo-electric converter which scans an original picture or document (to be referred to as the "original", hereinafter) to be sent, but the transmission is carried out only after applying various logic operations to the output signals from the photo-electric converter, so that the circuit construction becomes complicated and a memory with a large storing capacity is required. Thus, there are various restrictions for utilizing the band reduction systems. In addition, devices for the band reduction systems are expensive.

In view of the aforesaid difficulties of the conventional techniques, the inventors have proposed improved systems for reducing the transmission time which systems are not susceptible to adverse influences. The present invention provides an improved receiver-recorder which enables the optimal use of the previously proposed transmitting-time-reducing system.

SUMMARY OF THE INVENTION

It is an object, therefore, of the present invention to overcome the disadvantages and limitations of prior facsimile receivers by providing an improved facsimile receiver.

The above and other objects are attained by a facsimile receiving system having a means receiving said synchronizing signal for discriminating said synchronizing signal; a means receiving said group weight indicator signals following said synchronizing signal, for storing said group weight indicator signals in a temporary memory; a means reading said group weight indicator signals from said temporary memory for deciphering the signals thus read, prior to recording said picture signals on a recording paper; a means performing predetermined addition on a selective address register, based on the result of said deciphering; a means immediately distributing and applying picture signals to selected recording elements in accordance with addressing by said selective address register; a means recording said picture signals on a recording paper, and; a means performing auxiliary scanning during a period for receiving said synchronizing signal and said group weight indicator signals.

BRIEF DESCRIPTION OF THE DRAWINGS

The foregoing and other objects, features and attendant advantages of the present invention will be appreciated as the same become better understood from the following description with reference to the accompanying drawings wherein.

DETAILED DESCRIPTION OF THE PREFERRED EMBODIMENT

According to the present invention the predetermined number of continuous picture elements for one scanning line are divided into groups, each group consisting of a comparatively small number of adjacent picture elements, and each group is evaluated and weighed for producing a group weight indicator signal B. The value of the group weight indicator signal is binary 0 in the case where the group has no picture element which has a concentration different from that of the background, such as the blank of the original, while the value of the group weight indicator signal is binary 1 in the case where the group has at least one picture element which has a concentration different from that of the background. The group weight indicator signals B are adapted to be successively delivered in accordance with the sequence in which the groups of the picture elements are arranged. Then, the picture signals C, which represent picture elements belonging to the group having a group weight indicator signal B of value 1, are prepared for continuous and successive delivery. Synchronizing pulses A, each of which consists of a plurality of bits, represent the scanning movement of each scanning line, and each synchronizing signal A is adapted to precede the signals from the aforesaid signal families B and C. Signals to be transmitted, such as facsimile picture signals, are formed by repetitively producing serial signal arrays, each signal array including signals derived from the aforesaid three families, i.e., the signal families A, B, and C. The desired reduction of the transmitting time can be achieved by transmitting the serial signals thus prepared.

Figure 1:
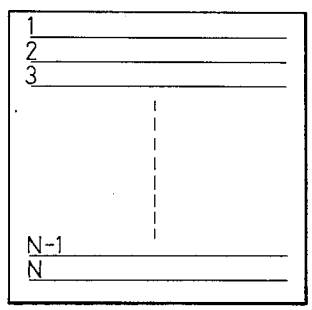
FIG. 1 is a diagrammatic illustration of scanning lines which are defined on an original picture to be transmitted.

FIG. 1 illustrates scanning lines which are set on an original pattern to be transmitted. One original, or one picture plane, includes N scanning lines, as numbered 1, 2, ..., N-1, and N.

Figure 2:
FIG. 2 is an explanatory diagram of a facsimile signal pattern, which is designed for eliminating the redundancy of the original.

FIG. 2 illustrates the manner in which the information on the entire picture plane is transmitted in the aforesaid fashion by repeating the serial signal arrays, each array having signals from the aforesaid three signal families. The information of only the first three scanning lines is represented in FIG. 2. The suffix numerals in FIG. 2 correspond to the scanning line numbers of FIG. 1. In order to ensure the identity between the received picture signals and the transmitted picture signals, only the synchronizing signal A has a constant length, throughout the entire scanning lines, and the bit pattern of the synchronizing signal A is kept constant, also. The bit pattern of the synchronizing signal A consists of a pattern whose frequency of occurrence is minimum, and the pattern of occurrence of the signal A is discernible from the pattern of occurrence of the group weight indicator signal B and from the pattern of occurrence of the picture signal C. About twenty bits are sufficient for constituting one synchronizing signal A having the aforesaid bit pattern characteristics. The group weight indicator signal B has a constant bit length, in principle, and the bit pattern of said signal B is continually changing, depending on the contents of the original being transmitted. Both the bit length and the bit pattern of the picture signal C are continually varying. The bit length of the picture signal C is restricted so as to be equivalent to the product of the number of picture elements belonging to one group and an integer. A dummy signal may be inserted between the signal C and the signal A under certain conditions. However, the arrangement of the serial signal, as illustrated in FIG. 2, is assumed throughout the following explanation, because the dummy signal is merely used as the waiting time in the case where the mechanical follow-up characteristics of the related scanning mechanism is inadequate.

Figure 3:
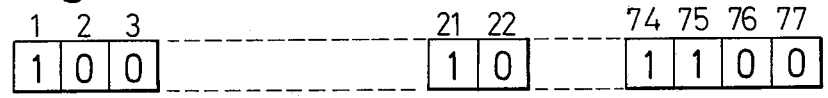
FIG. 3 is an explanatory diagram of the contents of the group weight indicator signal.

FIG. 3 illustrates an example of the group weight indicator signal B. If it is assumed that there are 80 groups on one scanning line, 77 group weight indicator signals B are produced, as implied in FIG. 3. Starting from the extreme left end (representing the beginning of the scanning line), the 1st, 21st, 74th, and 75th groups have group weight indicator signals of value 1, indicating that such groups include black picture elements therein; while the 2nd, 3rd, 22nd, 76th, and 77th groups have group weight indicator signals of value 0, indicating the total absence of black picture elements in such groups. For simplicity, the conditions of other groups are not shown in the figure. In the actual transmission, the group weight indicator signal is provided with a parity and then transmitted. Actually, the original to be transmitted often includes a considerably large amount of blank spaces, and the possibility of causing all the bits in the group weight indicator signals to be 0 is comparatively high. Under such conditions, in order to improve the transmission efficiency (or transmitting speed), the bit pattern for the signal B may be modified, e.g., into a shorter length. Details of such modification, however, will not be discussed here.

As described above, in comparison with the conventional facsimile telegraphy which transmits image signals as scanned along a line, the transmitting system as proposed by the inventors is featured by operationally treating the image signals which belong to one scanning line, so as to transmit the signals in the form of serial repetition of signal arrays, each array consisting of signals from the three families, i.e., the aforesaid synchronizing signals, the group weight indicator signals, and the picture signals. Thus, as compared with a system which transmits all the signals as scanned, the system proposed by the inventors reduces the amount of information to be transmitted to about ¼ on the average, and the transmitting time is also cut down to about ¼ on the average.

The present invention provides a receiver-recorder which receives the facsimile signal being transmitted in the form of serial repetition of signal arrays, each array consisting of signals from the aforesaid three different families, and records the signal thus received in the form of a picture. The invention will now be described in detail. It should be noted that, in the particular form of the facsimile signals to be used by the present invention, the conventional notion of the so-called synchronized scanning is not used because the receiver is related to the transmitter by the particular form of the facsimile signals. Accordingly, there is no need at all for those conventional means which ensure identical scanning speeds between the transmitter and the receiver and keep the receiver constantly in phase with the transmitter.

The receiver-transmitter according to the present invention is closer to a conventional dot printer than to a conventional facsimile receiver. A dot printer has the same number of recording elements as the total number of picture elements on one scanning line, which recording elements are disposed at the positions corresponding to the picture elements positions set on the scanning line and are kept in contact with a recording paper or like recording medium. Proper recording elements are instantaneously selected from the aforesaid number of recording elements, so as to produce a picture on the recording paper at the positions corresponding to the selected recording elements. Various types of recording elements are actually used, dependingly on the type of the recording paper used. Some examples are as follows.

a. A multi-stylus electrode, for the electrostatic recording paper.

b. A thermal recording head element, for the thermal sensitive recording paper.

c. An optical fiber tube or a flying-spot tube, for the electrophotographic recording paper.

It is common throughout the above examples that the recording elements, whose number is the same as the number of picture elements on one scanning line, are aligned in a row, and proper elements are selected by an electron beam or an electronic means, so as to provide desired recording stimuli to the selected elements. In contrast to conventional rotary drum type facsimile receiver in which the entire picture elements are reproduced by a constant-speed scanning in a successive and continuous manner, the recording elements of the above examples are completely free from inertia and capable of performing variable speed scanning and arbitrary stoppage. The multi-stylus electrode of the electrostatic recording method will be taken as an example for describing the present invention in the following.

Figure 4:
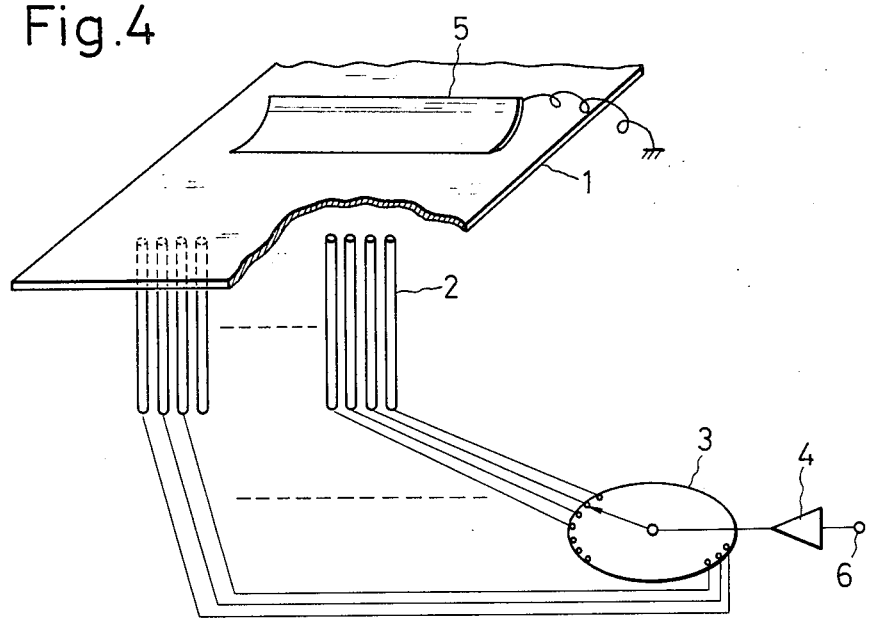
FIG. 4 is a schematic perspective view of a recording device, which can be used in the present invention.

FIG. 4 illustrates essential portions of an electrostatic recorder. In the figure, reference numeral 1 represents an electrostatic recording paper having a dielectric layer lined at the back surface thereof, and the front surface of the recording paper is so processed as to improve the electric conductivity thereof. Reference numeral 2 represents an individual stylus electrode for electrostatic recording, which is made of a phosphor-bronze wire of about 100 micron diameter, and the same number of such stylus electrodes as the number of picture elements on one scanning line are aligned in a row at uniform intervals, while keeping the tips of the styli on the face of the recording paper. Each of the stylus electrodes, acting as the aforesaid recording elements, is connected to a selector 3, which an be considered as a multi-contact rotary switch to be disposed in one electric circuit. The picture signals which are received at an input terminal 6 are amplified to elevated voltages by an amplifier 4, and then applied to the selector 3. The high-voltage signals selected by the switch are applied to the corresponding stylus electrodes, so as to cause electric discharges in the proximity of the recording paper and to produce records on the recording paper, which records correspond to the intensities of the aforesaid electric discharges. As regards the selector 3, a mechanical rotary switch cannot provide the desired high-speed switching operation, so that a completely electronic switching circuit is actually used, and FIG. 4 shows only a mechanical equivalent of such an electronic circuit. With such a completely electronic switching circuit, the specified recording elements can be selected instantly. A discharge electrode 5 is for discharging or grounding the residual electric charge remaining on the dielectric layer of the recording paper.

The same recording effect as achieved by the device using the recording elements consisting of the multistylus electrodes can be provided by the aforesaid optical fiber tube or the like wherein an electron beam is used for making selection. The above-mentioned examples enable the free selection of recording elements along one scanning line, but they do not allow instant selection of the recording elements belonging to different scanning lines. Accordingly, the recording paper should be moved, for switching the scanning lines. On the other hand, a flying-spot tube can select recording elements belonging to different scanning lines. This difference in the selecting ability is due to the arrangement of the recording elements, i.e., whether such elements are arranged one-dimensionally or two-dimensionally. Generally speaking, the one-dimensional arrangement is commonly used, and the following description of the present invention also relates to an embodiment using the one-dimensional arrangement of the recording elements. It should be noted, however, that the essential function of the two-dimensional arrangement is the same as that of the one-dimensional arrangement, except for the need of moving the recording paper.

In the embodiment of the present invention to be described hereinafter, use is made of recording elements which are similar to those of a dot printer and the number of the recording elements is selected to be the same as the total number of picture elements on one scanning line. Further, the recording elements are aligned in a row, so as to allow the instant selection of the desired recording elements by proper addressing for making records on a recording paper. The invention will now be described in further detail by referring to the circuit diagram of FIG. 5 and the operational time chart of FIG. 6.

Figure 5:
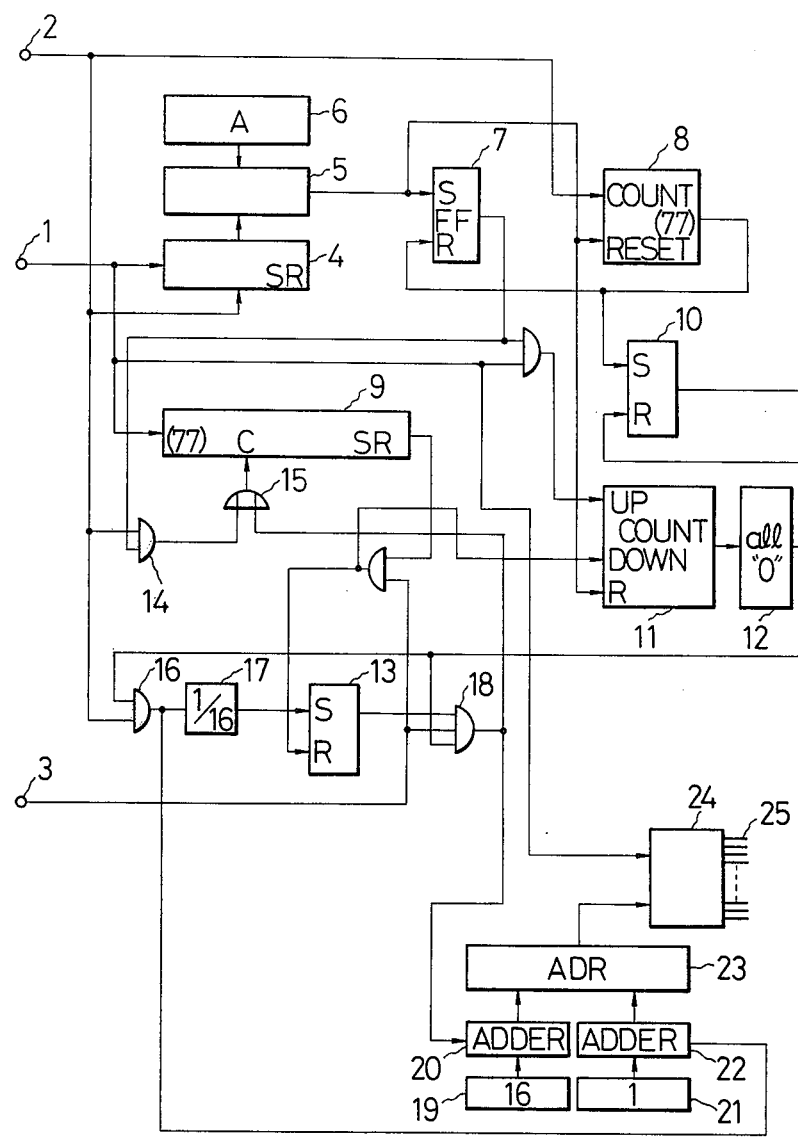
FIG. 5 is a block diagram of an electric circuit embodying the present invention.

In FIG. 5, reference numeral 1 represents an input terminal for a facsimile signal, and the signal at this input terminal 1 has a digital waveform of binary expression including 1 and 0. As shown in FIG. 2 this facsimile signal is received in the form of serial repetition of signal arrays, each array including signals from the three families. Although the actual signals being transmitted over a transmission circuit are phase modulated or amplitude modulated, such modulated signals are demodulated at the receiving end, so that the original serial signals of FIG. 2 are applied to the terminal 1. At the same time with the receiving of the facsimile signals, timing pulses corresponding to the actual transmitting speed used can be received at the terminal 2. If a transmitting speed of 4,800 bits/sec is used, the terminal 2 receives rectangular waves of 4,800 KHz.

The signal to the terminal 2 is also obtained from the demodulator, which provides both the picture signal to the terminal 1 and the clock signal of 4,800 Hz. Therefore the two signals to the terminal 1 and to the terminal 2 are synchronized in phase. A terminal 3 receives another timing pulse which is necessary for operatively treating the received signals so as to selectively address the recording elements for recording the received signals. The frequency of the timing pulse at the terminal 3 has a much higher frequency than that of the timing pulse at the terminal 2, and is, for instance, 750 KHz.

Let it be assumed that there are 1,232 picture elements in each scanning line, and one scanning line is divided into 77 groups, each group consisting of 16 picture elements, so as to formulate the aforesaid facsimile signal by eliminating the redundancy of the original. In this case, 77 steps of operational treatment must be effected at maximum, during the time period of one timing pulse at the terminal 2. Thus, the frequency of the timing pulse at the terminal 3 should be 77 times the pulse frequency at the terminal 2 or higher. Consequently the minimum frequency of the timing pulse at the terminal 3 becomes 77 times 4,800 Hz, i.e., 396.6 KHz. For the sake of margin, it is desirable to use a timing pulse of about 750 KHz, which provides 77 pulses within about one half of one interval between the adjacent timing pulses at the terminal 2. This 750 KHz timing pulse is separately generated at the receiving end, and it is not received from the sending end. As a matter of course, the facsimile signal at the terminal 1 is in synchronism with the timing pulse at the terminal 2.

At the beginning of the serial fascimile signal, the input terminal 1 receives a synchronizing signal A, which is directly applied to a shift register 4. The 4,800 Hz timing pulse is applied from the terminal 2 to the shift register 4, so that the facsimile signal is shifted in the shift register 4. The number of bits in the shift register 4 is set to be the same as the bit length of the synchronizing signal. If the synchronizing signal consists of 48 bits, the shift register 4 also has 48 bits. The synchronizing signal sent from the transmitting end has a bit pattern whose frequency of occurrence is the minimum among those in other signal families, i.e., the group weight indicator signals and the picture signals. The bit pattern of the synchronizing signal is represented by a symbol A. The same pattern A as that of the synchronizing pulse is set in a register 6, and the contents of the register 6 are compared with the contents of the shift register 4 by coincidence circuit 5. When the contents of the registers 4 and 6 coincide, the coincidence circuit 5 generates an output signal of valve 1. Thus, the output from the coincidence circuit 5 becomes binary 1 at the moment when the last bit of the synchronizing signal is set in the shift register 4, and the signals arriving at the receiver after this moment are discriminated as the group weight indicator signals. This output from the coincidence circuit 5 is applied to a flip-flop 7 for setting the flip-flop at 1. The time period when the flip-flop 7 produced the 1 output is the period when the group weight indicator signals are received. The length of the group weight indicator signal is predetermined, and in this case, it is the same as the number of groups in one scanning line, i.e. 77 bits. Thus, it is determined that the time period of 77 timing pulses following the moment when the flip-flop 7 is set at 1 is the period for receiving the group weight indicator signals. Accordingly, a counter 8 is provided, which is reset upon setting the flip-flop 7 at 1, so as to receive and count the succeeding timing pulses until 77 timing pulses are counted, when one output signal is produced by the counter 8, which output signal acts to reset the flip-flop 7. In this way, the flip-flop 7 discriminates and displays the period of receiving the group weight indicator signals. The group weight indicator signals received during the period are shifted to a shift register 9 and stored therein. This shift register 9 has 77 bits, which is the same as the number of groups in one scanning line. An AND gate 14 provides the timing pulse for shifting the information in the shift register 9 only during the receiving period, so that all the bits of the group weight indicator signals are stored in the shift register 9 during the receiving period.

The output from the coincidence circuit 5 is also applied to the reset terminal of an up-down counter 11, in parallel with the counter 8, so that the up-down counter 11 is reset to all 0 immediately after receiving the synchronizing signal. The logical produt signal between the signal from the terminal 1 and the output from the flip-flop 7 is applied to the up terminal of the up-down counter 11. Accordingly, only the group weight indicator signals are applied to this terminal. When such signals are received by the up terminal of the up-down counter 11, the number of 1 signals in the group weight signals is counted. Thus, if there are 77 groups in one scanning line, the counter 11 should have enough number of bits for counting up to 77. In a case of a binary counter, seven bits are necessary for that purpose. In short, during the period for receiving the group weight indicator signals, the receiver stores the group weight indicator signals in a temporary memory (i.e., the shift register 9) and, at the same time, the number of group weight indicator signals of value 1 is stored in another memory (i.e., the up-down counter 11).

The signal applied to the reset terminal of the flip-flop 7, which flip-flop is to display the period for receiving the group weight indicator signals, is also applied to the set terminal of a flip-flop 10. Thus, the flip-flop 10 is set at 1 simultaneously with the turning of the flip-flop 7 to its stable 1 state. What is displayed by the flip-flop 10 is the period for recieving the picture signals. Successive 16 bits of the received picture signals, which number of bits represents the number of picture elements (16 in this case) in one group, belong to one group of picture elements. In order to record the information of the successive 16 bits of the picture signals, as a group, at specified positions (as determined by the group weight indicator signal), it becomes necessary to define boundaries at every sixteen picture signals.

An AND gate 16 generates those timing pulses which are synchronized with the picture signals received during the picture signal receiving period. Those timing pulses from the AND gate 16 are applied to a frequency demultiplier 17. The frequency demultiplier 17 produces one output pulse for every 16 timing pulses applied thereto. Thus, the frequency demultiplier 17 is used for determining boundaries which belong to the group of the picture signals. The signal from the frequency demultiplier 17 is applied to the set terminal of a flip-flop 13. This flip-flop 13 displays the period for operational treatment, such as selective addressing of the recording elements, in response to the timing pulse from the terminal 3. More particularly, this flip-flop 13 is set at 1 each time picture signals for 16 picture elements are received. The timing pulse from the input terminal 3 and the output signal from the aforesaid flip-flop 13 are applied to an AND gate 18, which generates the high-frequency timing pulses. The frequency of the timing pulse from the AND gate 18 is high enough to insert at least 77 such pulses in a time period equivalent to one half of one interval between two adjacent timing pulses of the picture signal. The output signal from the AND gate 18 is also applied, through an OR gate 15, to the shift register 9 storing the group weight indicator signals, so as to shift the information therein. When a group weight indicator signal of valve 1 is delivered from the shift register 9 as a result of the aforesaid shifting, such 1 signal is applied to the reset terminal of the flip-flop 13 through an AND gate, so as to reset the flip-flop 13. Thus, the AND gate 18 ceases the delivery of the high-frequency timing pulses at the output terminal thereof, and the shifting of the contents of the shift register 9 is interrupted.

Let it be assumed that three 0 signals are consecutively present in the group weight indicator signals, and the shift register 9 acts to consecutively deliver such three 0 signals to the output terminal thereof, in response to the three timing pulses applied thereto. The three timing pulses which caused the shifting of the three 0 signals are also applied to an adder 20. This adder 20 acts to add a number 16, which number coincides with the number of picture elements in one group, to a selective address register (ADR) 23 of recording elements in a parallel fashion. Thus, the three timing pulses applied to the adder 20 cause to add $16 \times 3 = 48$ to the ADR 23. The register 23 produces an instruction which determines the number of switching operations to be performed by a selective switch circuit 24 equivalent to an electronic rotary switch, for determining which of the plurality of recording elements 25 should be selected for application of the desired recording information thereto. The recording information consists of the picture signals, which are applied from the input terminal 1 to the selective switch 24, as pointed out above.

The picture signals belonging to a group whose group weight indicator signal is 0 should be all 0, and such picture signals are eliminated at the transmitter from the signal being transmitted, so that such 0 picture signals of such groups are not transmitted to the receiver. Thus, it is unnecessary to successively select the recording elements for such 0 picture signals, for recording white, white, . . . A kind of interlaced recording may be effected, by making jumps for the all 0 groups, i.e., the groups whose picture signals are all 0, and making actual selection of the recording elements only for those groups whose group weight indicator signals are 1. This possibility of the interlaced recording is one of the important characteristics to the present invention.

To compensate for the jumping in the case of the group weight indicator signal of value 0, the adder 20 acts to add 16 to the ADR 23, which addend is identical with the number of picture signals in one group, for each 0 valued group weight indicator signal. In order to complete this addition before the picture signals of 1 valued groups are received one by one, the use of the aforesaid high-frequency timing pulse is necessary. Accordingly, if the shifting of the register 9 is interrupted, the selective address register 23 gives such an instruction which selects that recording element which is located at the position corresponding to the first bit in the 16-bit group to be recorded (which group immediately follows the aforesaid addition). Thus, the received picture signal is applied to that recording element which is specified by the selective address register, and in order to add 1 for the sake of the next arriving picture signal, there are provided an adder 22 and an addend register 21, the addend in this case being 1.

The output from the shift register 9 is also applied to the down terminal of the up-down counter 11 through an AND gate, so that the precounted number of the 1 valued groups is reduced by one each time the 16 picture signal bits belonging to a 1 valued group are received. Thus, when the count of this counter 11 is reduced to all 0, the reception of the entire picture signals is completed. This end of the receiving picture signals is detected by an all 0 checking circuit 12, and by applying the output signal from the checking circuit 12 to the reset terminal of the flip-flop 10.

In the foregoing, an arrangement from the receiving of the facsimile signals to the recording thereof is described. The present invention, however, is not restricted to the illustrated arrangement, and a wide variety of electronic circuits are possible for fulfilling the essential ideas of the present invention. The present invention is featured in that the received picture signals are directly distributed to and applied to proper recording elements, without necessitating any delaying or speed conversion by temporary memories or the like.

Figure 6:
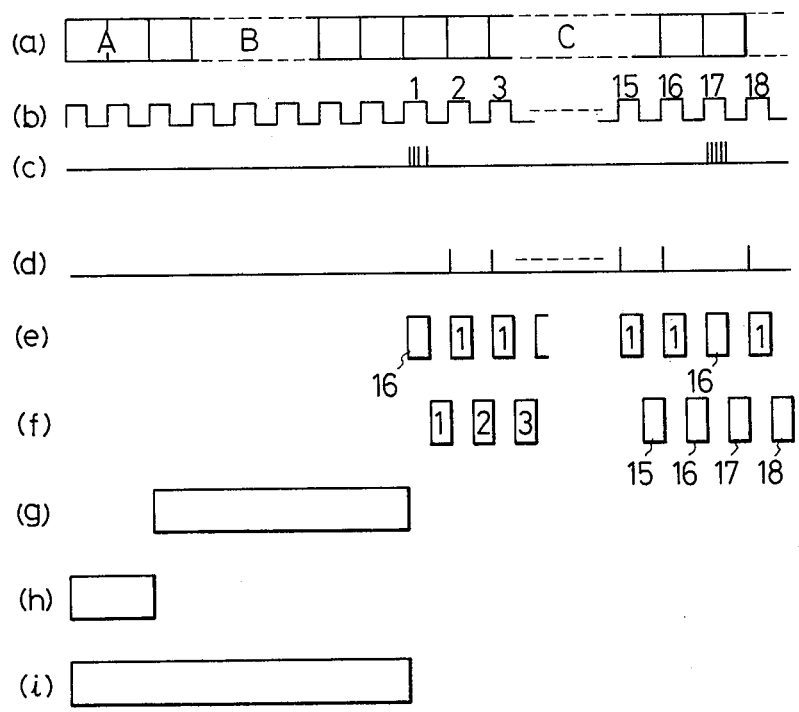
FIG. 6 is a time chart of the operation.

The operating sequence of the aforesaid arrangement will now be described by referring to the time chart of FIG. 6. FIG. 6a shows the serial repetition of signal arrays, each array having signals from three families, i.e., the synchronizing signal A (shown as a 2-bit signal for the illustrating purpose), the group weight indicator signals B, and the picture signals C. FIG. 6b shows the timing pulse which is obtained in synchronism with the aforesaid serial signal. The timing pulse is illustrated as 4,800 Hz rectangular pulses. FIG. 6c represents that timing pulse which actuates the addition of 16 in the selective address register 23 of the recording elements. In this case, 77 pulses, corresponding to the 77 groups of one scanning line, are generated within one half of the interval between the adjacent pulses of the 4,800 Hz timing pulse. Each of such 77 pulses can cause the addition of 16. FIG. 6d shows that pulse which causes the addition of 1 in the selective address register 23 of the recording elements, in order to record the picture signals belonging to the group having a group weight indicator signal of value 1. The pulse of FIG. 6d is generated from the 4,800 Hz timing signal in synchronism with the picture signals. The timing pulses of FIGS. 6c and 6d, i.e., the pulses for causing additions in the selective address register 23, are generated only during the picture signal receiving period, and in this case, the pulses of FIG. 6c and 6d are present only during the first half of the inter-pulse interval of the timing pulses in synchronism with the picture signals. FIG. 6e shows the periods for the aforesaid additions in the selective address register, and there are periods for adding 16 and periods for adding 1, as described above, FIG. 6f shows the periods for distributing the received picture signals to the recording elements in accordance with the instruction from the selective address register, so as to record the picture signals. The picture signals of group 1 are recorded during the period designated by the numeral 1. FIG. 6g shows the period for receiving the group weight indicator signals, during which period the received group weight indicator signals are stored in a temporary memory (or a shift register) and simultaneously the number of 1 signals therein is stored in another temporary memory. FIG. 6h illustrates the synchronizing signal receiving period, during which period the synchronizing signals are received and discriminated, and at the same time, auxiliary scanning takes place in the receiver-recorder. The auxiliary scanning is usually effected by a mechanical means, so that it cannot be done instantly, and the time for auxiliary scanning is at least partly overlapped with the synchronizing signal receiving period. If the synchronizing signal receiving period is not long enough for the auxiliary scanning, the period for receiving the group weight indicator signals may also be used for the auxiliary scanning. The maximum length of the time allowable for the auxiliary scanning is shown in FIG. 6i. In the illustrated example, the synchronizing signal includes 48 bits and the group weight indicator signal includes 77 bits, so that the sum of the two signals amounts to 125 bits, and the time length for the 125 bits is $125/4,800 \approx 26$ mS, provided that the transmitting speed is 4,800 bits/sec. A pulse motor can accomplish the auxiliary scanning within such a period of time. Accordingly, the present invention is also characterized in that an ample time period is allowed for the auxiliary scanning and the need for waiting time and delay time in the overall processing for the auxiliary scanning is completely eliminated. In the above described sequence, the received facsimile signals can be recorded on a recording paper in the form of pictures.

As explained in the foregoing, the receiving process can be clearly divided into four steps; namely, (a) receiving and discriminating the synchronizing signal, (b) performing additions in the selective address register, (c) distributing and recording the picture signals, and (d) auxiliary scanning. Since the steps (a), (b), and (c) can be performed serially and continuously without any overlapping, the following advantages can be achieved.

The picture signals are directly distributed, upon being received, to those recording elements which are specified by the selective address register, so that the need for temporary storage and delay and frequency conversion for the picture signals is completely eliminated, and the circuitry of the receiver-recorder becomes very simple. Besides, a scanning mechanism with inertia is not needed. Furthermore, the need for the painstaking pretransmission co-ordination between the transmitter and the receiver in the conventional facsimile, such as frequency synchronization and phase synchronization, can be eliminated. Causes for picture quality deterioration, such as jitter, can be removed. The danger of obscuring the boundaries of picture element groups can be minimized, too.

When the transmitting speed is modified on the transmitter side, the timing pulse corresponds to the new transmitting speed can be obtained, as shown in FIG. 6b, so that the modification of the transmission speed can be automatically taken care of on the receiver side. This is an outstanding achievement, in view of the fact that the conventional facsimile sytems require the frequency synchronism between the transmitter and the receiver with an accuracy of about $10^{-6}$, and a very expensive synchronizer has been used therefor.

The present invention can provide the following secondary effect. Since the aforesaid steps (a), (b), and (c) are clearly separated from each other without any overlap, it becomes possible to insert data signals, or other signals irrelevant to the facsimile signals, in the serial signal between the picture signal and the synchronizing signal, and such inserted signals can be discriminated without affecting the other operations while ensuring the normal operation of the facsimile receiver-recorder. Such insertion of the data signals or the like may be used for address information designating the destination of the facsimile telegraphic transmission.

As apparent from the foregoing disclosure, according to the present invention, there is provided an economical receiver-recorder for a facsimile telegraphic system of the so-called transmitting-time-reducing type, which system does not directly transmit the image signals of scanning lines but eliminates the redundancy of the original picture by transmitting the image signals in the form of continuous serial repetition of the signal arrays, each array including signals from three families, i.e., synchronizing signals, group weight indicator signals, and picture signals, and which receiver-recorder is characterized by receiving the synchronizing signal, determining the presence or absence of the synchronizing signal, receiving the group weight indicator signals succeeding the synchronizing signal while using the synchronizing signal as the reference, discriminating the group weight indicator signals for storing them in a temporary storing means, deciphering the group weight indicator signals thus stored prior to recording the picture signals succeeding the group weight indicator signals, distributing and applying the picture signals to selected recording elements upon receiving the picture signals, based on the result of the deciphering, so as to record the picture on a recording paper, and performing auxiliary scanning during the period of time for receiving the synchronizing signal and the group weight indicator signals. Thus, the receiver-recorder according to the present invention can receive and record the fascimile signals in a very simple and economical fashion, and the receiver-recorder can easily adapt itself to variations of the outside conditions, such as changes in the transmitting speed initiated from the transmitter side.

It should be understood, of course, that the embodiments disclosed above are only illustrative and are not intended to limit the scope of the invention. Reference should be made by the accompanying claims, therefore, rather than to the specification, as indication of the scope of the invention.

What is claimed is:

1. A receiver in a facsimile system which transmits signals corresponding to a plurality of scanning lines via a continuous serial repetition of signal arrays, each signal array corresponding to a given scanning line and including a synchronizing signal, group weight indicator signals, and picture signals corresponding to that line, said receiver including means for receiving and processing each given signal array comprising: means for receiving said synchronizing signal of said given signal array; means for receiving said group weight indicator signals of said given signal array which follow said synchronizing signal of said given signal array, and for storing said group weight indicator signals of said given signal array in a temporary memory; means for reading said stored group weight indicator signals from said temporary memory and for deciphering the signals thus read, prior to recording the picture signals of said given signal array on a recording paper; means for performing predetermined addition on a selective address register, based on the result of said deciphering; means for receiving the picture signals of said given signal array and for immediately distribution and applying said received picture signals upon receipt to selected recording elements in accordance with addressing by said selective address register; means for recording said applied picture signals on a recording paper, and; means for performing auxiliary scanning during a period for receiving said synchronizing signal and said group weight indicator signals of said given signal array.

2. A receiver in a facsimile system according to claim 1, wherein said temporary memory has 77 bits.

3. A receiver in a fascimilar system according to claim 1, wherein said means for recording the applied picture signals on a recording paper is a dot printer having the same number of recording elements as the total number of picture elements on the scanning line corresponding to said given signal array.

* * * * *